(12) United States Patent
Arai

(10) Patent No.: US 10,137,711 B2
(45) Date of Patent: Nov. 27, 2018

(54) IMAGE FORMING SYSTEM INCLUDING PLURALITY OF SHEET FEEDERS AND METHOD THEREFOR HAVING SWITCHING CONTROL FEATURES

(71) Applicant: BROTHER KOGYO KABUSHIKI KAISHA, Nagoya-shi, Aichi-ken (JP)

(72) Inventor: Yusuke Arai, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 15/277,608

(22) Filed: Sep. 27, 2016

(65) Prior Publication Data
US 2017/0087895 A1  Mar. 30, 2017

(30) Foreign Application Priority Data
Sep. 30, 2015 (JP) .................................. 2015-194531

(51) Int. Cl.
*B41J 13/00* (2006.01)
*G06K 15/16* (2006.01)
(Continued)

(52) U.S. Cl.
CPC ......... *B41J 13/0018* (2013.01); *B41J 13/009* (2013.01); *G06K 15/16* (2013.01);
(Continued)

(58) Field of Classification Search
CPC ...... B41J 29/393; B41J 13/0018; B41J 29/38; B41J 2/16547; B41J 2/16538;
(Continued)

(56) References Cited

U.S. PATENT DOCUMENTS 4,770,555 A    9/1988  Deschamps et al.
9,770,929 B2*  9/2017  Horade .................. B41J 29/393
(Continued)

FOREIGN PATENT DOCUMENTS

EP    1591262 A2    2/2005
JP    2-39967 A     2/1990
(Continued)

OTHER PUBLICATIONS

Office Action (Notice of Allowance) issued in related U.S. Appl. No. 15/009,306, dated May 24, 2017.
(Continued)

*Primary Examiner* — Yaovi M Ameh
(74) *Attorney, Agent, or Firm* — Merchant & Gould P.C.

(57) ABSTRACT

An image forming system has a transmission assembly, standard and auxiliary sheet feeders, standard and auxiliary trays, an image forming device and a controller. The transmission assembly is for switching transmission of a drive force of a motor selectively to the one of the standard and auxiliary sheet feeders. The controller determines whether sheet is absent in the standard tray. The controller, based on determining the sheet is absent in the standard tray and receipt of preceding data, control the transmission assembly to initiate to switch the transmission of the drive force to the auxiliary sheet feeder. Also the controller, based on receipt of control data received after preceding data, control the image forming device to form an image based on the control data.

30 Claims, 8 Drawing Sheets

(51) Int. Cl.
 B41J 29/393 (2006.01)
 B41J 29/38 (2006.01)
 G06K 15/00 (2006.01)

(52) U.S. Cl.
 CPC .............. *B41J 29/38* (2013.01); *B41J 29/393* (2013.01); *B65H 2403/00* (2013.01); *G06K 15/4025* (2013.01)

(58) Field of Classification Search
 CPC ... B41J 2/16508; B41J 13/0009; G06K 15/16; G06K 15/4025; B65H 2403/00
 See application file for complete search history.

(56) References Cited

U.S. PATENT DOCUMENTS

| | | |
|---|---|---|
| 2004/0184081 A1 | 9/2004 | Yamamoto |
| 2008/0094444 A1 | 4/2008 | Sakurai |
| 2009/0060555 A1 | 3/2009 | Okada et al. |
| 2011/0310423 A1 | 12/2011 | Motosugi |
| 2012/0146282 A1 | 6/2012 | Chiba |
| 2012/0200872 A1 | 8/2012 | Ito |
| 2012/0249707 A1* | 10/2012 | Horade .................. B41J 11/485 347/104 |
| 2014/0021677 A1 | 1/2014 | Nunokawa |
| 2016/0219179 A1 | 7/2016 | Matsui |
| 2016/0224876 A1* | 8/2016 | Horade .............. G06K 15/4025 |

FOREIGN PATENT DOCUMENTS

| | | |
|---|---|---|
| JP | 10-235970 A | 9/1998 |
| JP | 2000-163225 A | 6/2000 |
| JP | 2000-218894 A | 8/2000 |
| JP | 2002-73300 A | 3/2002 |
| JP | 2004-237505 A | 8/2004 |
| JP | 2005-238710 A | 9/2005 |
| JP | 2005-313440 A | 11/2005 |
| JP | 2008-105209 A | 5/2008 |
| JP | 2010-117792 A | 5/2010 |

OTHER PUBLICATIONS

Final Office Action issued in related U.S. Appl. No. 15/007,798, dated May 19, 2017.
Related U.S. Appl. No. 15/009,306, filed Jan. 28, 2016.
U.S. Office Action (Restriction Requirement) issued in related U.S. Appl. No. 15/009,306 dated Jun. 20, 2016.
Office Action from related U.S. Appl. No. 15/007,798, dated Aug. 12, 2016.
Related U.S. Appl. No. 15/007,798, filed Jan. 27, 2016.
Office Action issued in related U.S. Appl. No. 15/009,306, dated Dec. 1, 2016.
U.S. Office Action (Notice of Allowance) issued in related U.S. Appl. No. 15/007,798, dated Jan. 22, 2018.

* cited by examiner

IMAGE FORMING SYSTEM INCLUDING PLURALITY OF SHEET FEEDERS AND METHOD THEREFOR HAVING SWITCHING CONTROL FEATURES

CROSS-REFERENCE TO RELATED APPLICATION

This application claims priority under 35 U.S.C. § 119 from Japanese Patent Application No. 2015-194531 filed on Sep. 30, 2015. The entire subject matter of the application is incorporated herein by reference.

BACKGROUND

Technical Field

The present disclosures relate to an image forming system.

Related Art

Conventionally, an image forming system configured to form an image on a sheet based on image data transmitted from a personal computer or the like has been known. Further, there has also been known a technique to transmit a preparation command to an image forming system from a personal computer or the like before transmitting image data. In response to receipt of such a preparation command, the image forming system implemented with the above technique is typically configured to execute one or more preparation operations (e.g., cleaning of a recording head, releasing of capping, etc.) related to image formation.

SUMMARY

It is noted that some of the preparation operations are unstable until transmission of image data from the personal computer is started. According to conventional art, such an unstable preparation operation will not typically be executed until a correct operation is determined. Therefore, according to the conventional art, it has been difficult to improve throughput regarding image formation.

According to aspects of the disclosures, there is provided an image forming system, which is provided with a communication interface, a standard sheet feeder configured to pick up sheet on a standard tray, an auxiliary sheet feeder configured to pick up sheet on a second tray, a motor configured to selectively apply a drive force to one of the standard and auxiliary sheet feeders, a transmission assembly configured to switch transmission of the drive force selectively to the one of the standard and auxiliary sheet feeders, by switching a connection between the motor and the one of the standard and auxiliary sheet feeders, an image forming device including a recording head, and a controller configured to. The controller is configured to receive preceding data from the communication interface, determine whether the sheet is present or absent in the standard and the auxiliary trays, based on determining that the sheet is absent in the standard tray and the sheet is present in the auxiliary tray and receipt of the preceding data, control the transmission assembly to initiate to switch the transmission of the drive force to the auxiliary sheet feeder, and based on receipt of control data received after the preceding data from the communication interface, control the image forming device to form an image on picked-up sheet based on the control data included in the control data.

According to aspects of the disclosures, there is also provided a method of controlling an image forming system including a transmission assembly for switching transmission of a drive force of a motor selectively to the one of standard and auxiliary sheet feeders. The method includes receiving preceding data from a communication interface of the image forming system, determining whether the sheet is present or absent in standard and auxiliary trays, the standard sheet feeder being configured to pick up sheet on the standard tray and the auxiliary sheet feeder being configured to pick up sheet on the auxiliary tray based on determining that the sheet is absent in the standard tray and the sheet is present in the auxiliary tray and receipt of the preceding data, controlling the transmission assembly to initiate to switch the transmission of the drive force to the auxiliary sheet feeder, based on receipt of control data received after the preceding data from the communication interface, controlling an image forming device including recording head to form an image on picked-up sheet based on the control data included in the control data.

According to aspects of the disclosures, there is provided an image forming system, which is provided with a communication interface, a standard sheet feeder configured to pick up sheet on a standard tray, an auxiliary sheet feeder configured to pick up sheet on an auxiliary tray, a motor configured to selectively apply a drive force to one of the standard and auxiliary sheet feeders, a transmission assembly configured to switch transmission of the drive force selectively to the one of the standard and auxiliary sheet feeders, by switching a connection between the motor and the one of the standard and auxiliary sheet feeders, an image forming device including a recording head, and a controller. The controller is configured to receive preceding data from the communication interface, determine whether the sheet is present or absent in the standard tray, based on determining that the sheet is absent in the standard tray and receipt of the preceding data, control the transmission assembly to initiate to switch the transmission of the drive force to the auxiliary sheet feeder, and based on receipt of control data received after the preceding data from the communication interface, control the image forming device to form an image on picked-up sheet based on the control data included in the control data.

BRIEF DESCRIPTION OF THE ACCOMPANYING DRAWINGS

Figure 3:
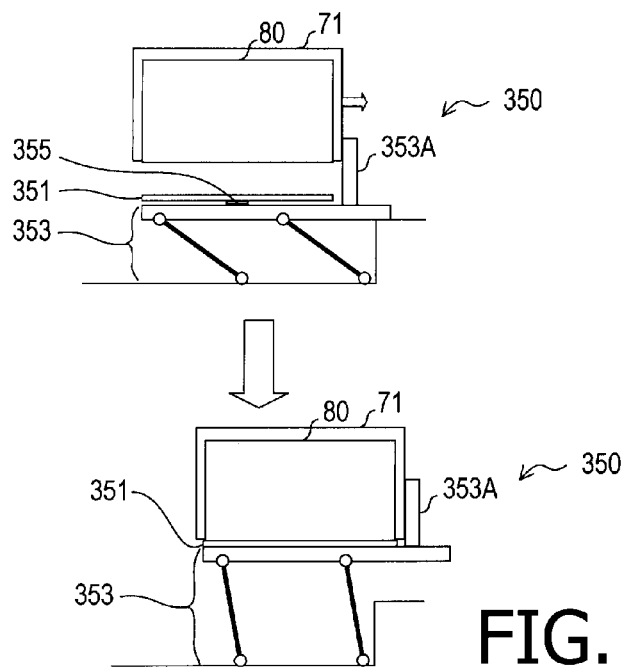

FIG. 3 schematically shows a configuration of a capping mechanism of an image forming system according to the illustrative embodiment of the present disclosures.

Figure 4A:
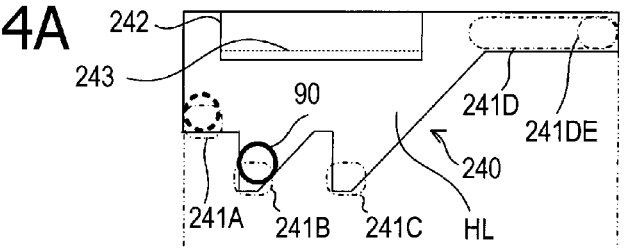

FIG. 4A is a plane view schematically showing a configuration of a lever holder of an image forming system according to the illustrative embodiment of the present disclosures.

Figure 4B:
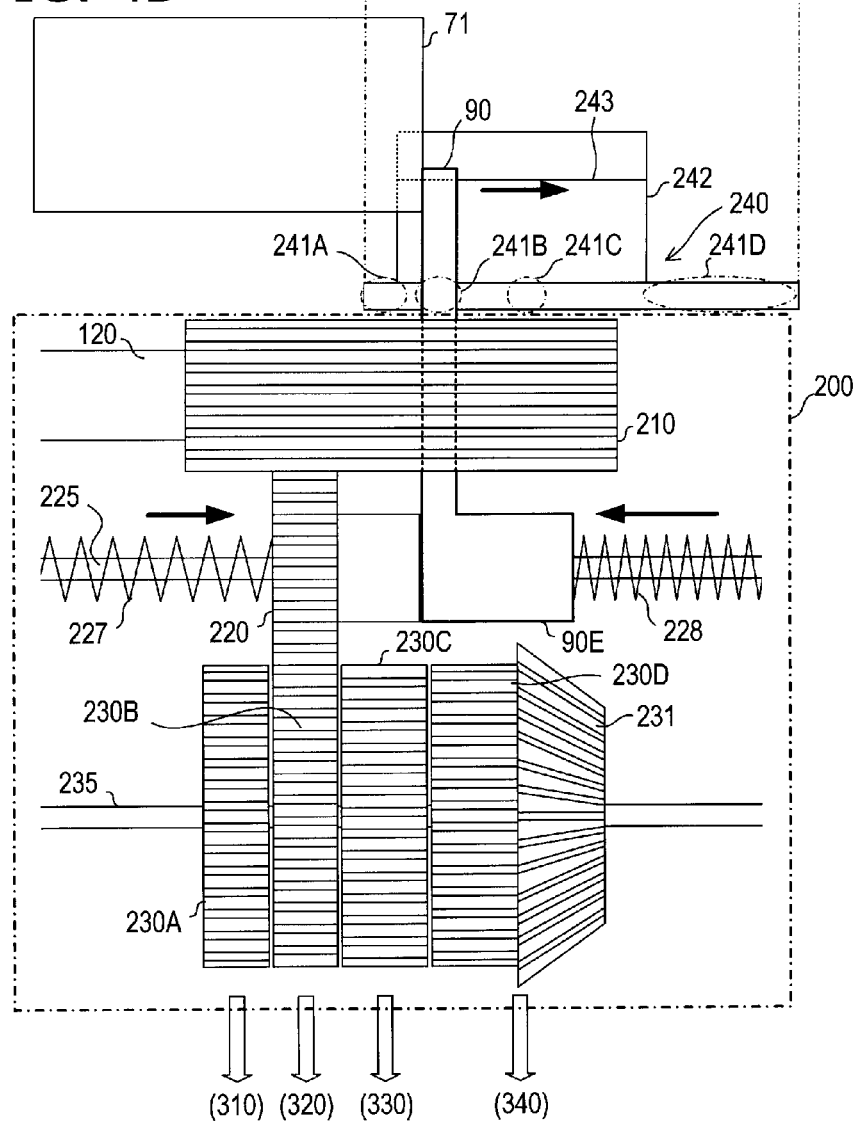

FIG. 4B is a side view schematically showing a configuration of a power transmitter of an image forming system according to the illustrative embodiment of the present disclosures.

Figure 5:
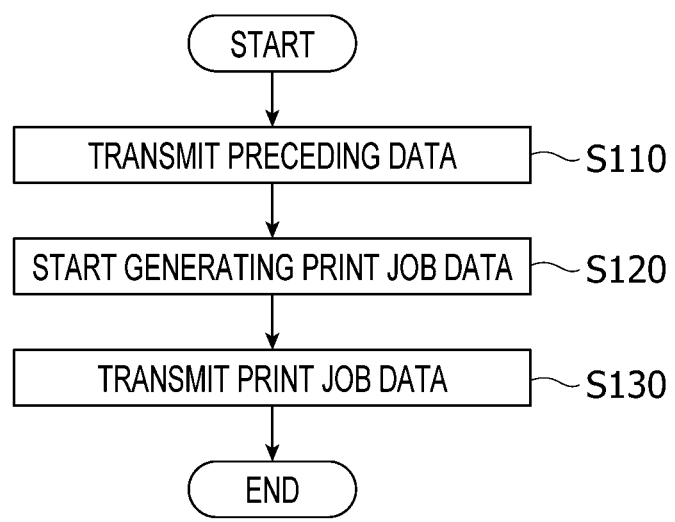

FIG. 5 is a flowchart showing a procedure to be executed by an information processing apparatus of an image forming system according to the illustrative embodiment of the present disclosures.

Figure 6:
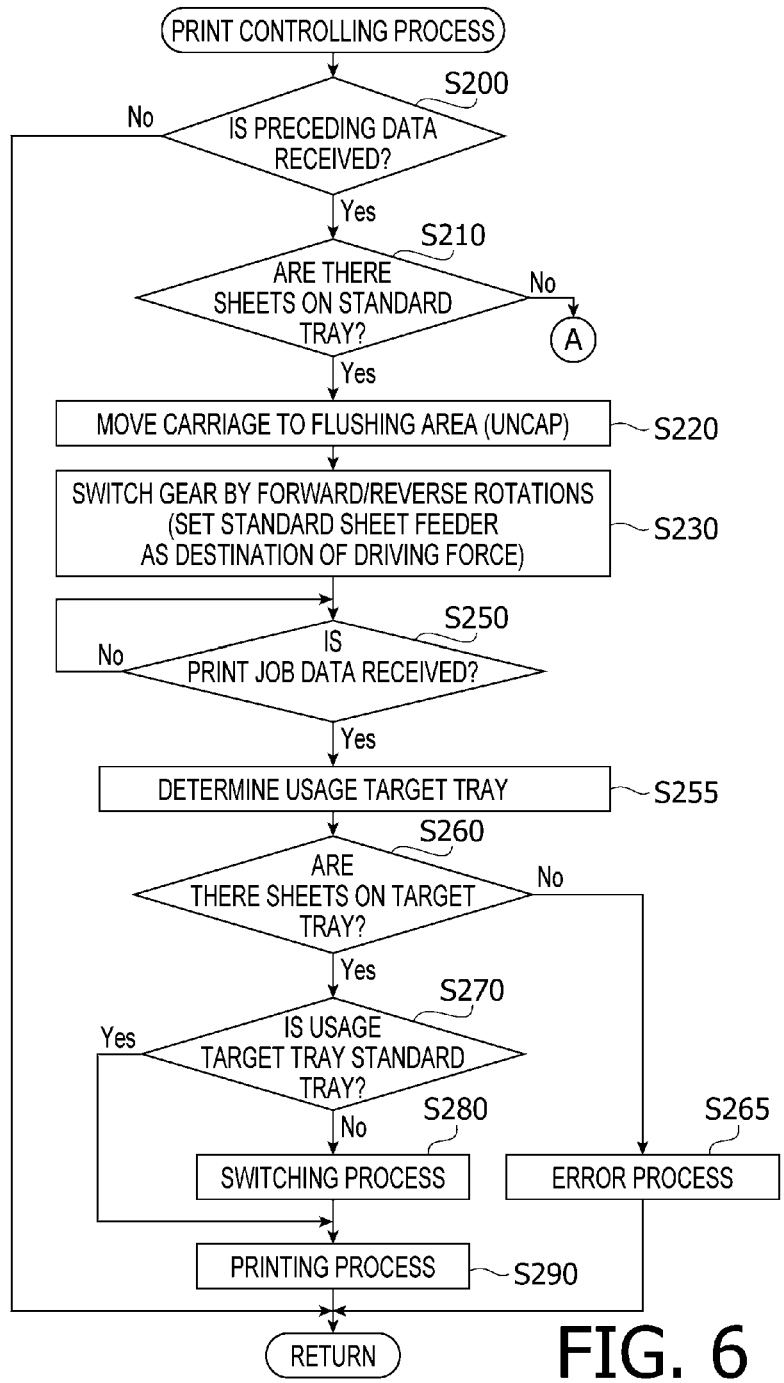
Figure 7:
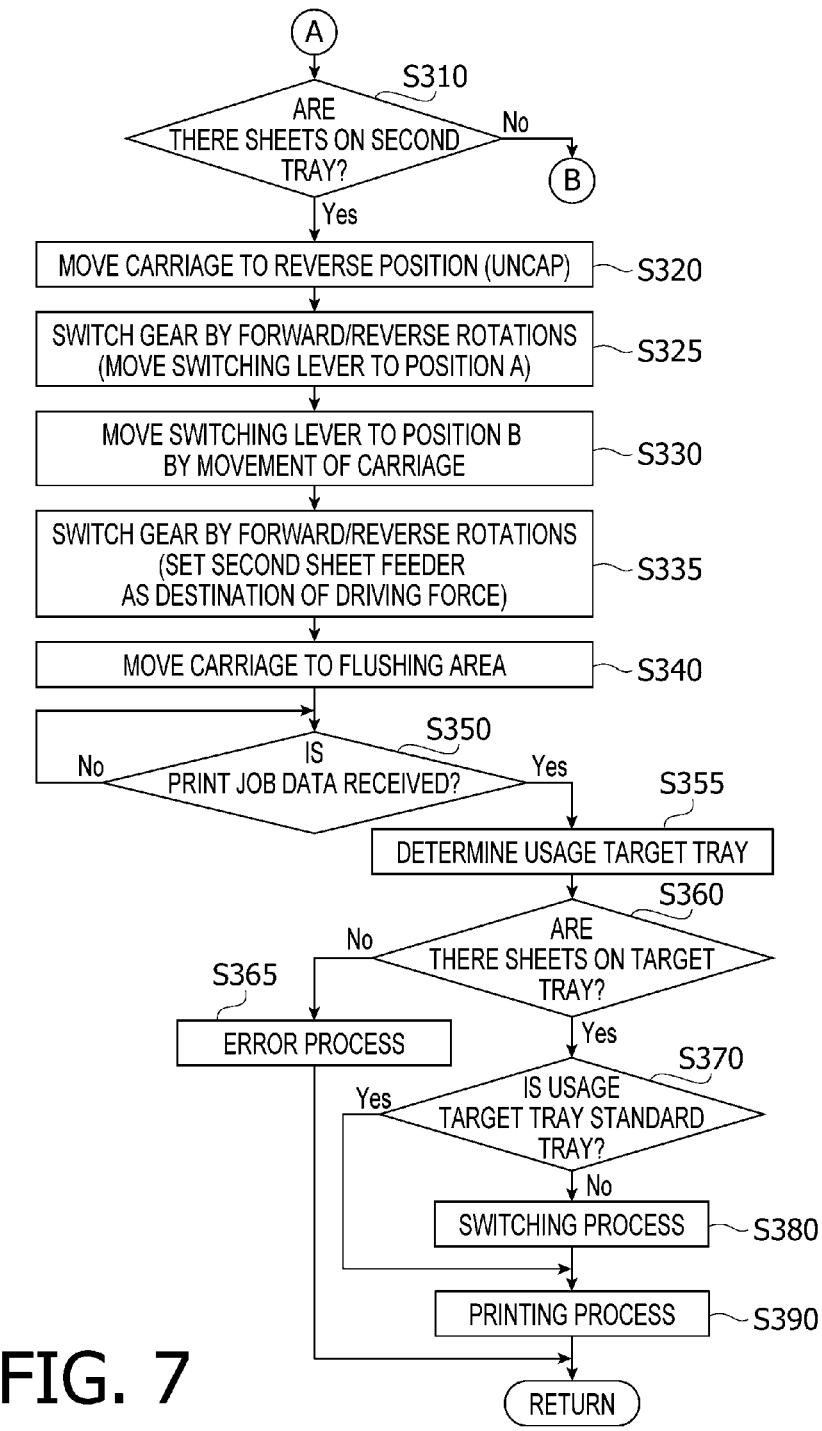
Figure 8:
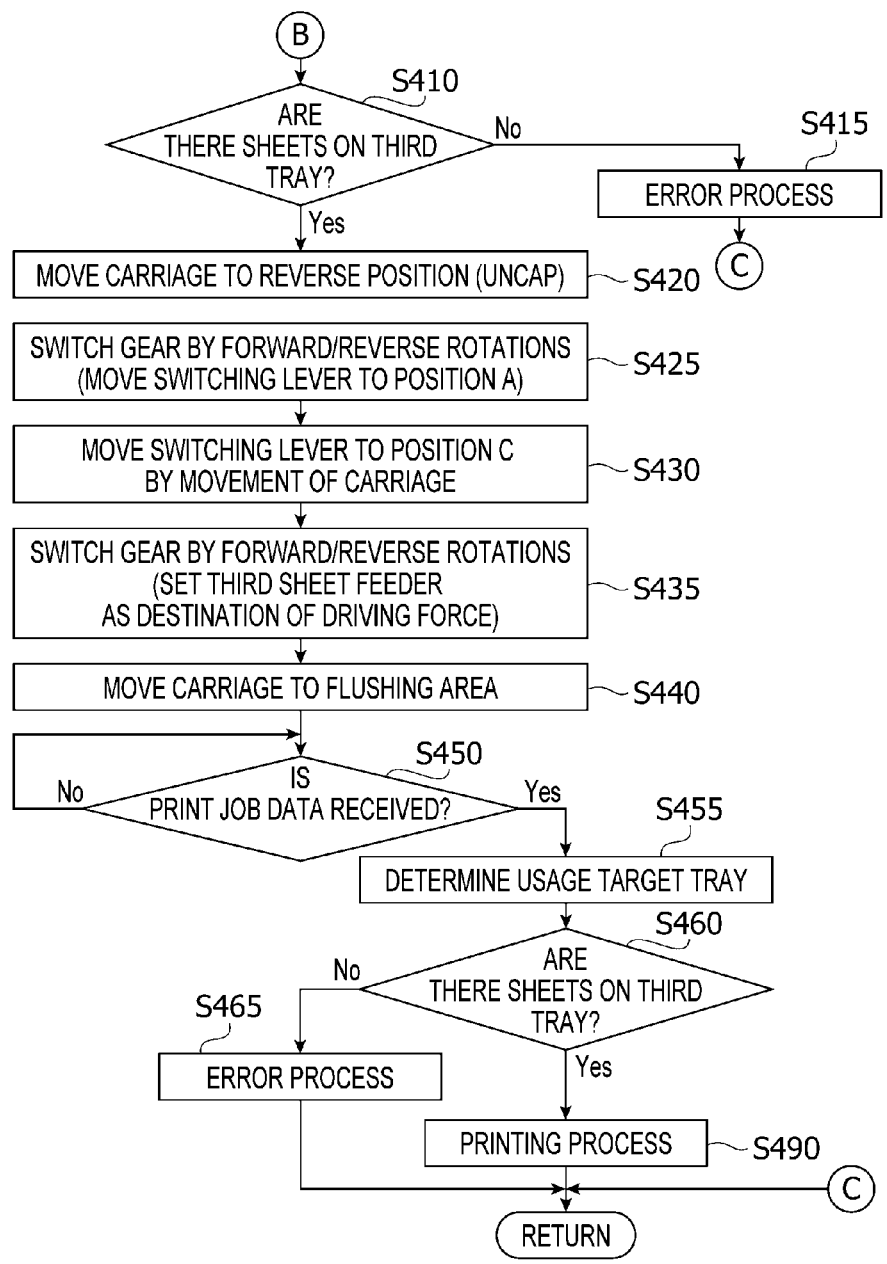

FIGS. 6-8 show a flowchart illustrating a print controlling process to be executed by a main controller of the image forming system according to the illustrative embodiment of the disclosures.

Figure 9A:
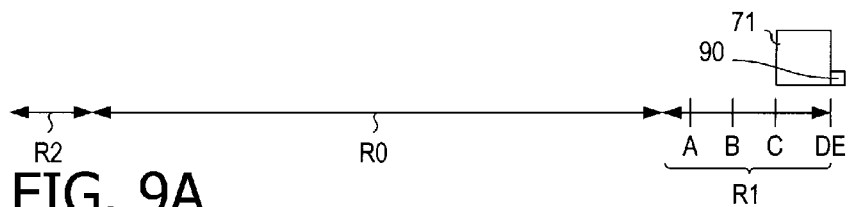
Figure 9B:
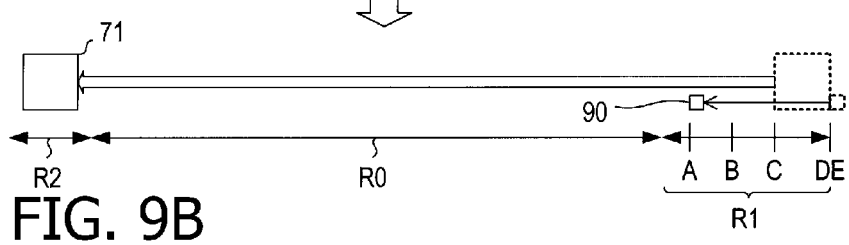

FIGS. 9A and 9B illustrate movement of the carriage when there are sheets on a standard tray.

Figure 10A:
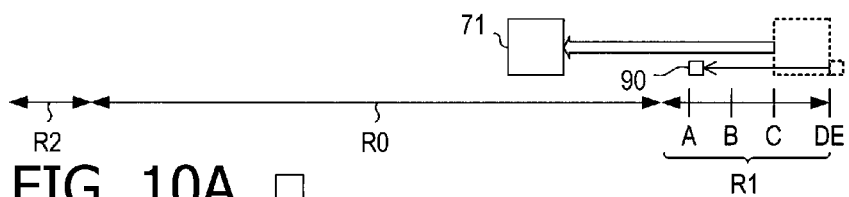
Figure 10B:
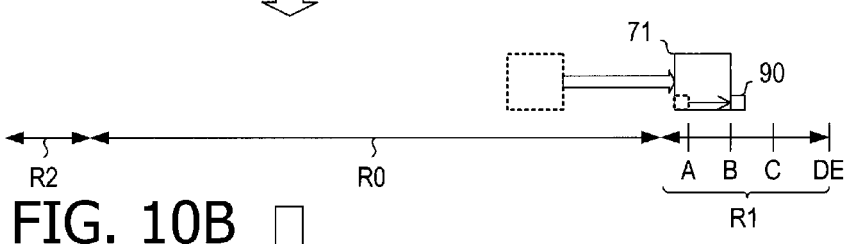
Figure 10C:
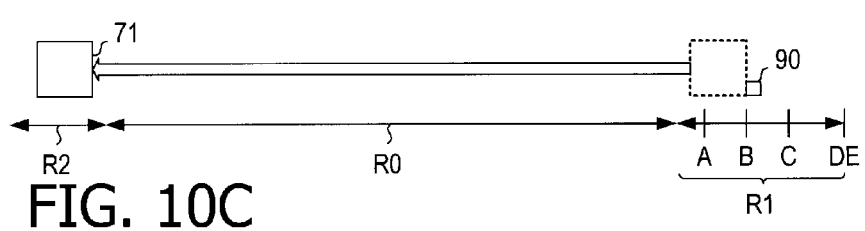

FIGS. 10A, 10B and 10C illustrate movement of the carriage when there is no sheet on the standard tray.

DETAILED DESCRIPTION OF ILLUSTRATIVE EMBODIMENT

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
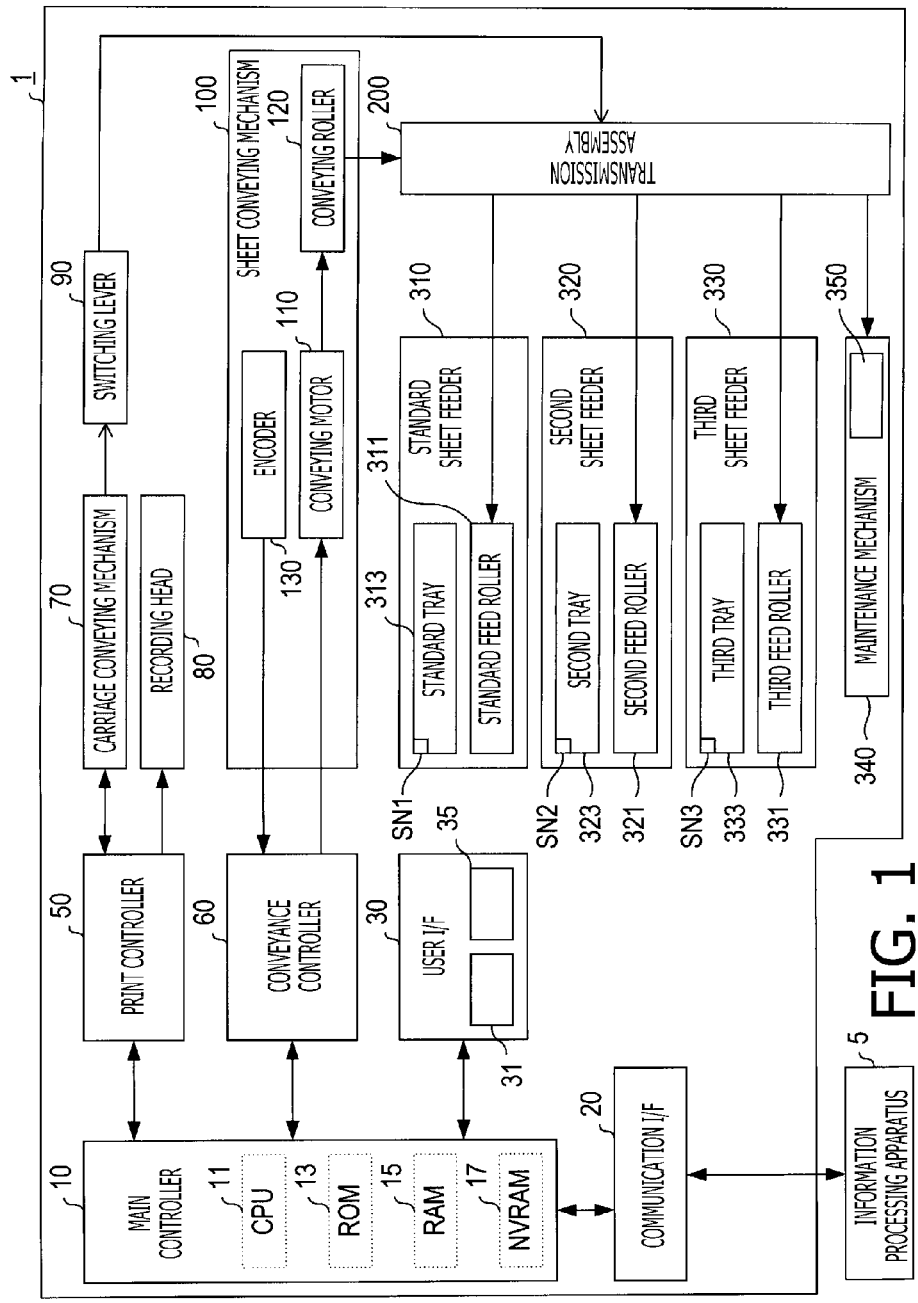
FIG. 1 is a block diagram schematically showing a configuration of an image forming system according to an illustrative embodiment of the present disclosures.

Hereinafter, an illustrative embodiment according to the present disclosures will be described with reference to the accompanying drawings. As shown in FIG. 1, an image forming system 1 according to the illustrative embodiment is configured as an inkjet printer, and includes a main controller 10, a communication interface 20, a user interface 30, a print controller 50 and a conveyance controller 60.

The image forming system 1 further includes a carriage conveying mechanism 70, a recording head 80, a switching lever 90, a sheet conveying mechanism 100, a transmission assembly 200, a standard (first) sheet feeder 310, a second (auxiliary) sheet feeder 320, a third (next-auxiliary) sheet feeder 330, and a maintenance mechanism 340.

The main controller 10 includes a CPU (central processing unit) 11, a ROM (read only memory) 13, a RAM (random access memory) 15, and an NVRAM (non-volatile RAM) 17. The ROM 13 is configured to store various programs. The NVRAM 17 is an electrically-rewritable non-volatile memory configured to store data and programs that needs to be retained even after the image forming system 1 is powered off. The CPU 11 is configured to execute processes in accordance with programs stored in the ROM 13 or the NVRAM 17. The RAM 15 is used as a work area during execution of the processes by the CPU 11.

The CPU 11 takes overall control of individual components included in the image forming system 1 by executing the processes in accordance with the programs stored in the ROM 13 or the NVRAM 17. Thereby, the CPU 11 achieves various functions. Hereinafter, the processes or operations by the CPU 11 may be described as processes or operations executed by the main controller 10.

The communication interface 20 is configured to execute data communication with an information processing apparatus 5 such as a personal computer. The communication interface 20 may be configured to communicate with the information processing apparatus 5 with a USB (universal serial bus) communication, Bluetooth® communication, a wired LAN (local area network), a wireless LAN and the like.

The user interface 30 includes a display 31 and an operation panel 35. The display 31 is configured to display information for a user. For instance, the display 31 may be a liquid crystal display. The operation panel 35 is operable by the user and configured to accept user operations. For instance, the operation panel 35 may be a touch panel provided on a screen of the display 31. Alternatively or optionally, the operation panel 35 may include a group of mechanical switches (e.g., buttons) or a combination of a touch panel and mechanical switches.

The print controller 50 is configured to control movement of a carriage 71 (see FIG. 2) with the recording head 80 mounted thereon and control an operation of ejection of ink droplets from the recording head 80 in accordance with instructions from the main controller 10. The print controller 50 controls the carriage conveying mechanism 70 and thereby controls movement of the carriage 71 along a main scanning direction. The main scanning direction is perpendicular to an auxiliary scanning direction (i.e., a sheet conveyance direction) in which sheets Q are conveyed (see FIG. 2).

Figure 2:
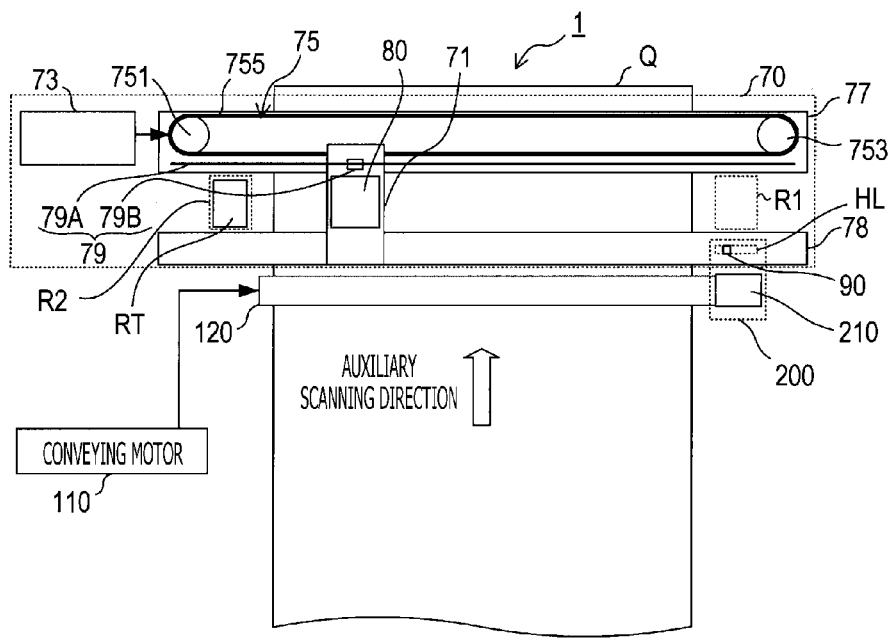
FIG. 2 is a plan view showing a configuration around a carriage of an image forming system according to the illustrative embodiment of the present disclosures.

As shown in FIG. 2, the carriage conveying mechanism 70 includes the carriage 71, a motor 73, a belt mechanism 75, guide rails 77 and 78, and a linear encoder 79. The motor 73 is controlled by the print controller 50.

The belt mechanism 75 includes a driving pulley 751, a driven pulley 753, and a belt 755. The driving pulley 751 and the driven pulley 753 are arranged along the main scanning direction. The belt 755 is an endless belt (i.e., annular belt) wound around the driving pulley 751 and the driven pulley 753. The carriage 71 is fixedly attached to the belt 755. In the belt mechanism 75, the driving pulley 751 rotates as a driving force is received from the motor 73. The belt 755 and the driven pulley 53 are driven to rotate in accordance with rotation of the driving pulley 751.

The guide rails 77 and 78 extend along the main scanning direction, and are spaced apart from each other in the auxiliary scanning direction. A hole HL is formed on the guide rail 78. The switching lever 90 protrudes upward (i.e., to a position above a carriage conveyance path) from beneath the guide rail 78 through the hole HL. The switching lever 90 will be described later in detail with reference to FIGS. 4A and 4B.

The belt mechanism 75 is arranged on the guide rail 77. For instance, a rib (not shown) extending in the main scanning direction may be formed on each of the guide rails 77 and 78, so as to restrict the moving direction of the carriage 71 to the main scanning direction. For instance, the carriage 71 may be placed on the guide rails 77 and 78 such that grooves formed on a lower surface of the carriage 71 engage with the ribs formed on the guide rails 77 and 78, respectively. In this state, the carriage 71 reciprocates along the main scanning direction on the guide rails 77 and 78 in association with rotation of the belt 755. The recording head 80, which is carried by the carriage 71, reciprocally moves along the main scanning direction with movement of the carriage 71.

The linear encoder 79 is configured to enable the print controller 50 to detect a position of the carriage 71 in the main scanning direction. Specifically, the linear encoder 79 includes an encoder scale 79A and an optical sensor 79B. The encoder scale 79A is fixedly attached onto the guide rail 77. The optical sensor 79B is fixedly attached to the carriage 71. The linear encoder 79 detects, with use of the optical sensor 79B, a change of a relative position between the encoder scale 79A and the optical sensor 79B, and transmits a detection signal representing the change of the relative position to the print controller 50 as an encoder signal.

The print controller 50 detects the position of the carriage 71 in the main scanning direction, based on the encoder signal transmitted from the linear encoder 79. The print controller 50 controls the position and the velocity of the carriage 71 in the main scanning direction, by controlling the motor 73 based on the detected position of the carriage 71. Further, the print controller 50 controls the operation of ejecting ink droplets by the recording head 80 in accordance with movement of the carriage 71, so as to let the ink droplets land on intended positions on a sheet Q and form an appropriate image thereon.

The conveyance controller 60 (see FIG. 1) controls a conveying motor 110 in accordance with instructions from the main controller 10. The sheet conveying mechanism 100 includes the conveying motor 110, a conveying roller 120, and a rotary encoder 130. The conveying motor 110 is linked with the conveying roller 120. Thereby, the conveying roller 120 is driven to rotate by the conveying motor 110.

The conveying roller 120 is disposed upstream, in the sheet conveyance direction, with respect to an ink ejection position where the recording head 80 ejects ink droplets. The conveying roller 120 has a rotational axis parallel to the main scanning direction. The conveying roller 120 is configured to, when rotating, convey the sheet Q fed from upstream, toward the ink ejection position in the auxiliary scanning direction. The conveying roller 120 is disposed to face a pinch roller (not shown). The sheet conveying mechanism 100 conveys the sheet Q by rotating the conveying roller 120 with the sheet Q being pinched between the conveying roller 120 and the pinch roller.

The rotary encoder 130 is configured to enable the conveyance controller 60 to detect a rotation amount and a rotation speed of the conveying roller 120. Specifically, the rotary encoder 130 is configured to output an encoder signal according to rotation amount of the conveying roller 120. For instance, the rotary encoder 130 is disposed on a power transmission path between the conveying motor 110 and the conveying roller 120.

The conveyance controller 60 detects the rotation amount and the rotation speed of the conveying roller 120 based on the encoder signal transmitted from the rotary encoder 130, and controls the conveying motor 110. Thus, the conveyance controller 60 controls the rotation of the conveying roller 120 and thereby controls conveyance of the sheet Q.

The transmission assembly 200 is disposed at an end portion opposite to another end portion to which the conveying motor 110 is connected. The transmission assembly 200 is configured to receive a driving force from the conveying motor 110 via the conveying roller 120 and transmit the driving force to one of driven targets (i.e., a standard (first) sheet feeder 310, a second (auxiliary) sheet feeder 320, a third sheet (next-auxiliary) sheet feeder 330, and a maintenance mechanism 340). Specifically, the transmission assembly 200 switches a connection state between the conveying motor 110 and the mechanisms 310, 320, 330 and 340 based on a position of the switching lever 90, so that driving force of the conveying motor 110 is transmitted to one of the standard sheet feeder 310, the second sheet feeder 320, the third sheet feeder 330 and the maintenance mechanism 340.

The standard (first) sheet feeder 310 includes a standard (first) feed roller 311, a standard (first) tray 313 and a standard (first) sheet sensor SN1. The standard feed roller 311 rotates in response to receipt of the driving force transmitted from the conveying motor 110 via the transmission assembly 200. The standard sheet feeder 310 picks up one of the sheets Q set in the standard tray 313 and feeds the picked-up sheet Q toward the conveying roller 120 from upstream side, by rotation of the standard feed roller 311. The standard tray 313 could be a cassette type tray configured to accommodate a plurality of sheets Q. The sheet sensor SN1 is configured to detect presence/absence of a sheet Q in the standard tray 313 to generate a detection signal, which is transmitted to the main controller 10.

Similar to the standard sheet feeder 310, the second sheet feeder 320 includes a second (auxiliary) feed roller 321, a second (auxiliary) tray 323 and a second (auxiliary) sheet sensor SN2. The second feed roller 321 rotates in response to receiving the driving force transmitted from the conveying motor 110 via the transmission assembly 200. The second sheet feeder 320 picks up one of the sheets Q set in the second tray 323 and feeds the sheet Q toward the conveying roller 120 from upstream side, by rotation of the second feed roller 321. The second tray 323 could be a cassette type tray configured to accommodate a plurality of sheets Q, similar to the standard tray 313. The second sheet sensor SN2 detects presence/absence of the sheet Q in the second tray 323. A detection signal from the second sheet sensor SN2 is input into the main controller 10.

Similar to the standard sheet feeder 310, the third sheet feeder 330 includes a third (next-auxiliary) feed roller 331, a third (next-auxiliary) tray 333 and a third (next-auxiliary) sheet sensor SN3. The third feed roller 331 rotates in response to receiving the driving force transmitted from the conveying motor 110 via the transmission assembly 200. The third sheet feeder 330 picks up one of the sheets Q set in the third tray 333 and feeds the sheet Q toward the conveying roller 120 from upstream side, by rotation of the third feed roller 331. The third tray 333 could be a cassette type tray configured to accommodate a plurality of sheets Q, similar to the standard tray 313. The third sheet sensor SN3 detects presence/absence of the sheet Q in the third tray 333. A detection signal from the third sheet sensor SN3 is input into the main controller 10.

The maintenance mechanism 340 is configured to perform maintenance of the recording head 80. As the maintenance is performed by the maintenance mechanism 340, an ink-ejection performance is well maintained, thereby images can be formed on the sheets Q appropriately. The maintenance mechanism 340 includes a capping mechanism 350 and a pump (not shown). The pump operates in response to receiving the driving force from the conveying motor 110 via the transmission assembly 200.

The capping mechanism 350 is disposed in a maintenance area R1 (see FIG. 2) on the conveyance path of the carriage 71. The maintenance area R1 is arranged at an end portion of the conveyance path of the carriage 71 in the main scanning direction. A middle portion of the conveyance path of the carriage 71 in the main scanning direction is a main area R0 in which the recording head 80 reciprocates to perform image formation on the sheet Q. The maintenance area R1 is arranged neighboring the main area R0 (see FIGS. 9A-10C).

As shown in FIG. 3, the capping mechanism 350 includes a cap 351 and an elevator 353. The cap 351 is configured to cover a nozzle surface of the recording head 80. In the nozzle surface, ejection ports for ejecting ink droplets are arranged. The cap 351 is connected with the elevator 353 via a spring 355. An upper part of FIG. 3 schematically shows a positional relationship between the cap 351 and the elevator 353 before the cap 351 is attached onto the recording head 80. A lower part of FIG. 3 schematically shows a positional relationship between the cap 351 and the elevator 353 after the cap 351 is attached onto the recording head 80.

The elevator 353 has a wall 353A configured to contact the carriage 71. The elevator 353 operates in response to receiving a force from the carriage 71. Specifically, in response to the carriage 71 coming into the maintenance area MA from the main area and moving to a terminal end of the carriage conveyance path, the elevator 353 gradually lifts up the cap 351 in response to receipt of the force from the carriage 71 via the wall 353A, and finally attaches the cap 351 onto the nozzle surface of the recording head 80. The attachment of the cap 351 is completed in response to the carriage 71 reaching the terminal end of the carriage conveyance path (i.e., at position DE in FIGS. 9A-10C).

In response to the carriage 71 leaving the terminal end of the carriage conveyance path and moving toward the main area R0, the elevator 353 is released from a state where the elevator 353 is receiving the force from the carriage 71 via the wall 353A, and moves such that the cap 351 moves down by its own weight. In response to the cap 351 being moved down, the cap 351 is detached from the recording head 80.

Thus, the capping mechanism 350 mechanically operates in response to receiving the force from the carriage 71, and attaches/detaches the cap 351 to/from the recording head 80. The pump operates in response to receipt of the driving force from the conveying motor 110 in a state where the cap 351 is attached on the recording head 80, and the pump sucks and retrieves ink droplets ejected to the cap 351 from the recording head 80.

On a terminal end opposite to the maintenance area R1 in the main area R0, a plate RT (see FIG. 2) configured to receive ink droplets ejected by the flushing operation of the recording head 80 is arranged. In the following description, the area R2 provided with the plate RT will be also referred to as a flushing area R2.

Subsequently, the transmission assembly 200 will be described in detail. As shown in FIG. 4B, the transmission assembly 200 includes a driving gear 210, a movable gear 220, and connection gears 230A, 230B, 230C and 230D. The connection gears 230A, 230B, 230C and 230D correspond to the mechanisms 310, 320, 330 and 340, respectively. The driving gear 210, the movable gear 220, and the connection gears 230A, 230B, 230C and 230D are formed as spur gears. Hereinafter, a written expression "the connection gears 230A-230D" will be used to represent the connection gears 230A, 230B, 230C and 230D. Further, a written expression "the connection gear 230" will be used to represent an unspecified one of the connection gears 230A, 230B, 230C and 230D.

The driving gear 210 is fixedly attached to an end portion of the conveying roller 120 such that a rotational axis of the driving gear 210 is positionally coincident with a rotational axis of the conveying roller 120. Thereby, the driving gear 210 rotates integrally with the conveying roller 120. The driving gear 210 has such a dimension in an axial direction thereof as to always engage with the movable gear 220 within a movable range of the movable gear 220.

The movable gear 220 is disposed to always engage with the driving gear 210 and have a rotational axis parallel to the rotational axis of the driving gear 210. Along the rotational axis of the movable gear 220, a shaft 225 is inserted through a hole formed at a rotational center of the movable gear 220. Thereby, the movable gear 220 is disposed to be rotatable relative to the shaft 225 and slidable in its axial direction.

The movable gear 220 is configured to be guided by the shaft 225 and move between the connection gears 230A and 230D. The connection gears 230A-230D are arranged along the rotational axis (the shaft 225) of the movable gear 220 such that their side surfaces perpendicular to a rotational axis of the connection gears 230A-D face each other in a rotational axis direction of the connection gears 230A-D.

The movable gear 220 has such a dimension in its axial direction as to individually engage with each of the connection gears 230A-230D.

The shaft 225 supports the switching lever 90 such that an end portion 90E of the switching lever 90 is movable in a sliding manner. The end portion 90E of the switching lever 90 is arranged closer to the terminal end of the carriage conveyance path than the movable gear 220, so as to adjoin the movable gear 220.

Two springs 227 and 228 are attached to the shaft 225 and disposed to pinch therebetween the movable gear 220 and the end portion 90E of the switching lever 90. An urging force of the spring member 228 is larger than an urging force of the spring 227. Accordingly, the switching lever 90 receives, as a whole, an urging force directing from the connection gear 230D to the connection gear 230A, throughout a movable range of the switching lever 90. Since the movable gear 220 receives the urging force from the spring 227, in response to the switching lever 90 moving from the connection gear 230A to the connection gear 230D, the movable gear 220 moves as if it follows the switching lever 90. Thus, the movable gear 220 moves in accordance with the position (the movement) of the switching lever 90 by the action of the force from the spring 227.

As shown in FIG. 4A, the switching lever 90 is disposed in a lever holder 240 forming the aforementioned hole HL. In FIG. 2, the hole HL is shown as having an abstracted rectangular shape. However, more specifically, the hole HL is formed in a shape shown in FIG. 4A. FIG. 4A shows a specific shape of the hole HL when viewed from above the guide rail 78.

The lever holder 240 has a lever positioning areas 241A, 241B, 241C and 241D. When contacting an edge of the hole HL in the lever positioning area 241A, the switching lever 90 is held not to move to the main area R0 of the carriage conveyance path even by the action of the forces from the springs 227 and 228. While the switching lever 90 is in the lever positioning area 241A, the movable gear 220 is placed in a position to engage with the connection gear 230A.

In response to the carriage 71 entering the maintenance area R1 from the main area R0 and goes toward the terminal end of the carriage conveyance path, the switching lever 90 comes into contact with the carriage 71 and receives a pressing force from the carriage 71. Thereby, the switching lever 90 moves from the lever positioning area 241A to the lever positioning area 241D. In response to the carriage 71 moving toward the main area R0 of the carriage conveyance path, the switching lever 90 is released from the pressing force from the carriage 71, and moves from the lever positioning area 241D to the lever positioning area 241A by the action of the force from the spring member 228.

In a state where the end portion 90E of the switching lever 90 is in contact with the movable gear 220, when the switching lever 90 is in the lever positioning area 241B, the movable gear 220 is placed in a position to engage with the connection gear 230B. Likewise, when the switching lever 90 is in the lever positioning area 241C, the movable gear 220 is placed in a position to engage with the connection gear 230C. Moreover, when the switching lever 90 is in the lever positioning area 241D, the movable gear 220 is placed in a position to engage with the connection gear 230D.

The switching lever 90 receives, at the end portion 90E thereof, a torsional force (i.e., a force in a circumferential direction of the shaft 225) from the spring member 228. More specifically, the switching lever 90 receives a force directed toward a lower left side in FIG. 4A.

Accordingly, in a process of moving from the lever positioning area 241A to the lever positioning area 241D, the switching lever 90 moves along a lower edge of the hole HL in FIG. 4A. In the moving process, even though the carriage 71 moves backward to the main area R0, the switching lever 90 is held in the lever positioning area 241B or 241C by notches formed in the lever positioning areas 241B and 241C.

After the switching lever 90 is placed in the lever positioning area 241D, in response to the carriage 71 beginning to move backward, the switching lever 90 moves back to the lever positioning area 241A while being guided by a guide member 242, by the action of the force from the spring member 228. The guide member 242 includes a rail 243 formed to extend downward. The switching lever 90 moves back to the lever positioning area 241A while sliding in contact with the rail 243. At this time, the movable gear 220 moves to the connection gear 230A along with the switching lever 90, in response to receipt of the force from the end portion 90E of the switching lever 90.

The connection gears 230A-230D are rotatably supported by a common shaft 235 parallel to the rotational axis of the movable gear 220. A rotational axis of the connection gears 230A-230D is positionally coincident with the shaft 235. The connection gears 230A-230D are disposed within the movable range of the movable gear 220 in their rotational axis direction.

The connection gear 230A is connected with the standard sheet feeder 310. Specifically, in a state where the connection gear 230A engages with the movable gear 220, the connection gear 230A receives the driving force from the conveying roller 120 via the driving gear 210 and the movable gear 220, and transmits the driving force to the standard sheet feeder 310. Thereby, the standard sheet feeder 310 is driven.

The connection gear 230B is connected with the second sheet feeder 320. Specifically, in a state where the connection gear 230B engages with the movable gear 220, the connection gear 230B receives the driving force from the conveying roller 120 via the driving gear 210 and the movable gear 220, and transmits the driving force to the second sheet feeder 320. Thereby, the second sheet feeder 320 is driven.

The connection gear 230C is connected with the third sheet feeder 330. Specifically, in a state where the connection gear 230C engages with the movable gear 220, the connection gear 230B receives the driving force from the conveying roller 120 via the driving gear 210 and the movable gear 220, and transmits the driving force to the third sheet feeder 330. Thereby, the third sheet feeder 330 is driven.

The connection gear 230D includes a bevel gear 231 connected with the maintenance mechanism 340. In a state where the connection gear 230D engages with the movable gear 220, the connection gear 230D receives the driving force from the conveying roller 120 via the driving gear 210 and the movable gear 220, and transmits the driving force to the maintenance mechanism 340. Thereby, the maintenance mechanism 340 (more specifically, the pump) is driven.

In response to the switching lever 90 moving, in the lever positioning area 241D, toward the terminal end of the carriage conveyance path, the movable gear 220 is urged by the spring 227, but is prevented from moving toward the terminal end, by the bevel gear 231 of the connection gear 230D. Thereby, the movable gear 220 is maintained connected with the connection gear 230D, and is separated away from the end portion 90E of the switching lever 90 moving toward the terminal end.

In response to the switching lever 90 moving, in the lever positioning area 241D, toward the terminal end of the carriage conveyance path, the capping mechanism 350 lifts up the cap 351 in conjunction with movement of the carriage 71. In response to the switching lever 90 reaching an end 241DE of the lever positioning area 241D, the operation of capping the recording head 80 is completed.

The terminal end (where the operation of capping the recording head 80 is completed when the carriage 71 reaches) of the carriage conveyance path corresponds to a home position of the carriage 71. The image forming system 1 maintains a state where the carriage 71 is in the home position, during a period of time in which it is unnecessary to perform image formation on a sheet Q (e.g., when the image forming system 1 serves as an image scanner). At this time, the switching lever 90 is maintained placed in the end 241DE. Further, at this time, a power transmission path is interrupted between the conveying motor 110 and each of the standard sheet feeder 310, the second sheet feeder 320, and the third sheet feeder 330. In other words, at this time, the standard sheet feeder 310, the second sheet feeder 320, and the third sheet feeder 330 are disconnected from the conveying motor 110.

The main controller 10 controls respective components in the image forming system 1 such that, when print job data is transmitted from the information processing apparatus 5, images are formed based on print data included in the transmitted print job data are formed on the sheets Q. Specifically, in response to input of instructions to the print controller 50 and the conveyance controller 60, the main controller 10 controls the conveyance of the carriage 71, ejection of ink droplets from the recording head 80, the position of the switching lever 90, the sheet feeding operation by the sheet feeders 310, 320 and 330, and the sheet conveying operation by the sheet conveying mechanism 100. Details of these operations will be described later.

According to the illustrative embodiment, the information processing apparatus 5 is a personal computer. In the information processing apparatus 5, a printer driver for the image forming system 1 has been installed. The information processing apparatus 5 is configured to execute a process shown in FIG. 5, based on the printer driver, when a print instruction is input by the user through an application program.

When the print instruction is input, the image processing apparatus 5 transmits preceding data to a destination image forming system 1 which is designated by the user (S110). The preceding data is data notifying that print job data including print data will be transmitted, which is data instructing preparation for printing.

Thereafter, the information processing apparatus 5 starts generating print job data (S120). In S120, the information processing apparatus 5 converts data subject to printing, which is designated by the user in the application program, to print data used to print on the sheet Q. the print data may be, for example, image data expressed by page description language describing the data subject to print, or image data generated by rasterizing the data subject to print. When the print job data including the print data is generated, the information processing apparatus 5 add print condition data regarding print conditions such as a size and a type of the sheet Q to be used for printing on a head side, with respect to the print data, of the print job data.

The information processing apparatus 5 transmits the print job data to the image forming system 1 (S130). The print job data includes the print condition data and print data described above. In S130, the information processing apparatus 5 sequentially transmits the print data of which the conversion has been completed without waiting for conversion from the print object data to the print data is finished completely. The print data is generated for every unit of pixels which correspond to the amount of pixels formed on the sheet Q for each one-way conveyance of the carriage 71 in the main scanning direction (hereinafter, the amount of data will be referred to as "one-path amount" or "one-path unit" data).

The main controller 10 of the image forming system 1 receives the preceding data and the print job data from the image processing apparatus 5 in the transmitted order through the communication interface 20.

Next, refereeing to FIGS. 6, 7 and 8, a print controlling process executed by the main controller 10 will be described. Programs causing the main controller 10 (e.g., the CPU 11) to execute the print controlling process are store in the ROM 13 or the NVRAM 17. The main controller 10 is configured to execute the print controlling process repeatedly at every controlling timing.

When the print controlling process is started, the main controller 10 determines whether the preceding data is received, through the communication interface 20, from the image processing apparatus 5 (S200). When it is determined that the preceding data has not been received from the image processing apparatus 5 (S200: NO), the main controller 10 terminates the print controlling process. Thereafter, when the next controlling timing comes, the main controller 10 determines whether the preceding data is received from the image processing apparatus 5 again (S200). When it is determined that the preceding data has been received (S200: YES), the main controller 10 executes steps S210 onwards.

In S210, the main controller 10 determines presence/absence of the sheets Q in the standard tray 313 based on the detection signal of the standard sheet sensor SN1 (S210). When it is determined that there are the sheets Q in the standard tray 313 (S210: YES), the main controller 10 proceeds to S210.

In S220, the main controller 10 controls the carriage conveying mechanism 70 through the print controller 50 to move the carriage 71 from the home position to the flushing area R2. That is, the main controller 10 moves the carriage 71 from an area (I) to an area (II) shown in FIGS. 9A and 9B.

It is noted that positions A, B, C and DE shown in FIGS. 9 and 10 correspond to the first lever arrangement area 241A, the second lever arrangement area 241B, the third lever arrangement area 241C and the terminal end DE of the fourth lever arrangement area 241D. In the following description, the first lever arrangement area 241A, the second lever arrangement area 241B, the third lever arrangement area 241C, the fourth lever arrangement area 241D and the terminal end DE of the fourth lever arrangement area 241D will also be referred to as positions A, B, C, D and DE, respectively.

As the main controller 10 executes the process in S220, restraining of the switching lever 90 by the carriage 71 is released, thereby the switching lever 90 becoming movable to the position A, and the cap 351 is removed from the recording head 80. As described above, the switching lever 90 cyclically moves among the positions A, B, C and D in this order and then moves back to the position A. As the carriage 71 is located at the home position, the switching lever 90 located at the position D (i.e., the position DE) becomes movable to the position A in accordance with movement of the carriage 71.

When the carriage 71 is conveyed from the home position toward the main area R0 side, the capping mechanism 350 operates to lower the cap 351 as described above. Therefore, by the movement of the carriage 71 in S220, the cap 351 is removed from the recording head 80.

It is noted that the reason why the carriage 71 is moved to the flushing area R2 in S220 is that the flushing operation by the recording head 80 is executed as a process included in the printing process immediately before an image is formed on the sheet Q by ejecting the ink droplets from the recording head 80. The flushing operation corresponds to an operation to eject dried ink by ejecting the ink droplets from the recording head 80. In order to execute the flushing operation, the carriage 71 needs to be located at the flushing area R2 before the printing process. For this purpose, in S220, the carriage 71 is located to the flushing area R2 as a preparation operation executed before the printing process.

In response to execution of S220 by the main controller 10, the movable gear 220 tends to move toward the position A side (i.e., the connection gear 230 side) together with the switching lever 90 receiving the urging force of the spring member 228. However, such a movement is prevented by interference with other connection gears 230B and 230C. Therefore, in order to move the movable gear 220 toward the connection gear 230A side to engage therewith, the main controller 10 executes a control to rotate the movable gear 220 repeatedly in forward/reverse directions minutely (S230).

Specifically, the main controller 10 controls conveying motor 110, through the conveyance controller 60, to rotate, through the driving gear 210, the movable gear 220 in the forward/reverse directions alternately and minutely. By repeating this back-and-force minute rotation, the teeth of the movable gear 220 and the gear grooves of the connection gear 230 in the moving direction engage with each other at a certain timing, and the movable gear 220 is moved toward the connection gear 230A. In the following description, the alternate forward/reverse minute rotations of the movable gear 220 as described above will also be referred to simply as forward/reverse rotations.

As S230 is executed, the switching lever 90 is located to the position A and the movable gear 220 engages with the connection gear 230A, thereby a destination of the driving force of the conveying motor 110 is set to the standard sheet feeder 310. As a result, the standard tray 313 is set to be a conveyance origin tray from which the sheets Q are supplied to the sheet conveying mechanism 100 (i.e., the conveying roller 120).

It is noted that, if the printing system 1 is configured such that the movable gear and the connection gear can engage with each other without the forward/reverse rotations, the forward/reverse rotations discussed above can be omitted. In such a case, only by execution of S220, without executing S230, the switching lever 90 is moved to the position A. I response to movement of the switching lever 90, the movable gear 220 engages with the connection gear 230A, thereby the standard sheet feeder 310 being set to the destination of the driving force. It is further noted that, in parallel with S220 and S230, the main controller 10 may be configured to adjust the driving voltage of the recording head 80 stepwise to execute driving preparation of the recording head 80.

After execution of S230, the main controller 10 waits for receipt of top one-path amount of print job data following the preceding data through the communication interface 20

(S250: NO). When the main controller 10 receives the one-path amount of print job data (S250: YES), the main controller 10 determines a usage target tray based on the print condition represented by the received top one-path amount of print job data (S255).

In S255, the main controller 10 determines a tray which meets the print condition or is most adaptive to the print condition, from among the standard tray 313, the second tray 323 and the third tray 333 as the usage target tray. The usage target tray corresponds to the tray to be set as the conveyance origin tray. It is noted that the size and the type of the sheets Q to be used and setting values of a sheet feed tray are included in the print condition data as information representing the print condition.

The setting values of the sheet feed tray included in the print job data includes "automatic selection," "the standard tray," "the second tray" and "the third tray." When the setting value of the sheet feed tray is the "automatic selection," the main controller 10 determines the usage target tray based on the information regarding the size and type of the sheets Q to be used.

For example, it is assumed that the standard tray 313 and the second tray 323 are cassette type trays, and the third tray 333 is a fixed type tray. It is further assumed that, in such a state, information regarding the types and sizes of the sheets Q accommodated in the standard tray 313 and the second tray 323 has been input by the user in advance, through the input device 35 and has been stored in the NVRAM 17. In such a case, the main controller determines one of the standard tray 313 and the second tray 323 as the usage target tray based on the information stored in the NVRAM 17. It is noted, however, if the main controller 10 determines that none of the standard tray 313 and the second tray 323 stores the sheets Q which are adaptive to the size and type of the sheets Q indicated by the print condition, the main controller 10 may be able to determine the third tray 333 as the usage target tray.

When the setting value of the sheet feed tray represents one of "the standard tray," "the second tray" and "the third tray," the main controller 10 can determine the tray which meets the setting value from among the standard tray 313, the second tray 323 and the third tray 333 as the usage target tray.

After determination of the usage target tray in S255, the main controller 10 determines presence/absence of the sheets Q in the usage target tray based on the detection signal from one of the sheet sensors SN1, SN2 and SN3, which corresponds to the usage target tray (S260).

When it is determined that the there is no sheet Q in the usage target tray (S260: NO), the main controller 10 proceeds to S265 and executes an error process. The error process in S255 includes a process of transmitting, through the communication interface 20, error information indicating that there is no sheet Q in the usage target tray to the information processing apparatus 5 that is the transmission origin of the preceding data and the print job data. The error information may include information indicating that the print job has been cancelled. After the error process is executed, the main controller 10 terminates the print control process. Optionally, the error process in S255 may include a process to proceed to S270 when the sheet Q is supplied to the usage target tray.

When it is determined that there are sheets on the usage target tray (S260: YES), the main controller determines whether the usage target tray is the standard tray 313 (S270). When it is determined that the usage target tray is the standard tray 313 (S270: YES), the main controller 10 proceeds to S290 and starts executing the printing process. It is noted that the conveyance origin tray has been set to the standard tray 313, which is the usage target tray and the sheet feeder which is the destination of the driving force has been set to the standard sheet feeder 310, in the preparation operation (S220 and S230) previously executed.

In the printing process, the main controller 10 sequentially receives the print job data, which is transmitted on one-path unit basis, and transmits instructions to the print controller 50 and the conveyance controller 60 so that the print target image is printed on the sheet Q based on the received print job data.

As the print controller 50 and the conveyance controller 60 operates in response to the instructions as input, the sheet feeder that is the destination of the driving force is driven by the conveying motor 110 to pick up the sheet Q accommodated in or supported on the conveyance origin tray toward the conveying roller 120. According to the illustrative embodiment, the conveying roller 120 is configured to convey the sheet Q supplied from upstream to downstream, in the auxiliary scanning direction, by rotation thereof.

The carriage 17 is located to the flushing area R2, which the recording head 80 executes the flushing operation at the flushing area R2. Thereafter, the carriage 71 reciprocates within the main area R0, which the recording head 80 operates to eject the ink droplets at appropriate timings to form the print target image on the sheet Q. In synchronous with the reciprocating movement of the carriage 71, the conveying roller 120 conveys the sheet Q downstream by a particular amount in the auxiliary scanning direction at every one-path amount conveyance of the carriage 71. With the above sequence of operations, an image based on the print job data transmitted from the image processing apparatus 5 is formed on the sheet Q as in a well-known inkjet printer.

When it is determined that the usage target tray is not the standard tray 313 (S270: NO), the main controller proceeds to S280 and executes the switching process. By executing the switching process in S280, the main controller 10 sets the sheet feeder that is the destination of the driving force to one having the usage target tray from among the second sheet feeder 320 and the third sheet feeder 330, thereby the usage target tray being set as the conveyance origin tray.

The switching process executed by the main controller 10 includes a process of controlling the carriage 71 through the print controller 50 so that the switching lever 90 is moved to a position corresponding to the usage target tray. Further, the switching process includes a process of causing the movable gear 220 to make forward/reverse rotations through the conveyance controller 60. With this process, the connection status of the transmission assembly 200 is switched and the connection gear 230 connected to the sheet feeder corresponding to the usage target tray and the movable gear 220 engage with each other, thereby the sheet feeder corresponding to the usage target tray is set to the destination of driving force.

After execution of S280, the main controller 10 proceeds to S290 and executes the printing process. In the printing process, the main controller 10 transmits instructions to the print controller 50 and the conveyance controller 60 so that the images subject to print are printed on the sheets Q based on the print job data. As the printing process is executed, images are printed on the sheets Q supplied from the usage target tray (i.e., the second tray 323 or the third tray 333) based on the print job data transmitted from the image processing apparatus 5. After execution of the printing process, the maim controller 10 terminates the print controlling process.

When it is determined that the there is no sheet Q in the standard tray 313 (S210: NO), the main controller 10 proceeds to S310. In S310, the main controller 10 determines presence/absence of the sheets Q in the second tray 323. When it is determined that there are sheets Q in the second tray 323 (S310: YES), the main controller 10 proceeds to S320.

In S320, the main controller 10 controls the carriage conveying mechanism 70, through the print controller 50, to move the carriage 71 from the home position to a particular reverse position. That is, the carriage 71 is moved from a position indicated in FIG. 9A to a position indicated in FIG. 10A. The reverse position may be any position on the main area R0 side with respect to the position A. However, in order to execute following operations effectively, it is preferable that the reverse position is on the main area R0 side with respect to the flushing area R2. For example, the reverse position may be defined a position on the main area R0 side with respect to the position A, and at a position closest to the home position, at which the carriage 71 can be stably stopped thereat when the carriage 71 is conveyed from the home position.

As the main controller 10 executes S320, restraining of the switching lever 90 by the carriage 71 is released as in S220, thereby the switching lever 90 becoming movable to the position A and the cap 351 is removed from the recording head 80.

After execution of S320, the main controller 10 controls the conveyance controller 60 to execute forward/reverse rotations of the movable gear 220 so that the movable gear 220 engages with the connection gear 230 and the switching lever 90 is moved to the position A as in S230. This process is executed since the switching order of the switching lever 90 is determined to a particular order as described above.

Thereafter, the main controller 10 proceeds to S330, and controls the print controller 50 to move the carriage 71 to the position B so that the switching lever 90 is moved to the position B. Specifically, the main controller 10 moves the carriage 71 located at the reverse position as shown in FIG. 10A toward the maintenance area R1 side as shown in FIG. 10B, and moves the carriage 71 so that the switching lever 90 is pushed to be moved from the position A to the position B.

There is a possibility that movable gear 220 may not be engaged with the connection gear 230B corresponding to the position B simply by pushing the switching lever 90 to the position B, which is executed in S330. Therefore, in the following step (i.e., S335), the main controller 10 controls the movable gear 220 to make the forward/reverse rotations as in a process in S325.

By execution of S330 and S335, the switching lever 90 is located to the position B and the movable gear 220 engages with the connection gear 230B, thereby the destination of the driving force of the conveying motor 110 is set to the second sheet feeder 320. Thus, the second tray 323 is set to be the conveyance origin tray (S335).

According to the illustrative embodiment, when there is no sheet Q in the standard tray 313, the preparation operation for conveying the sheets Q is executed by setting the second tray 323 provided to the second sheet feeder 320, which can be set as the destination of the driving force subsequent to the standard sheet feeder 310, as the conveyance origin tray by switching the switching lever 90. Further, where there is no sheet Q either in the second tray 323, the third tray 333 provided to the third sheet mechanism 330, which can be set as the destination of the driving force subsequent to the second sheet feeder 320, as the conveyance origin tray with use of the switching lever 90.

As described above, according to the illustrative embodiment, when there is no sheet Q in the standard tray 313, in accordance with the switching order of the switching lever 90 and the gears, a tray accommodating the sheets Q and having a higher order according to the switching order is selected from among the second and third trays 323 and 333, each which has a lower order, according to the switching order, than the standard tray 313. According to such a configuration, setting of the conveyance origin tray which might be re-set when the print job is received cay be realized with suppressing the number of switching operations of the gears, thereby the preparation operation for conveyance of the sheets Q can be achieved efficiently.

When S335 is executed, the main controller 10 proceeds to S340 and controls the carriage conveying mechanism 70 through the print controller 50 to move the carriage 71 to the flushing area R2. That is, the carriage 71 is moved from a position shown in FIG. 10B to a position shown in FIG. 10C. With this movement, the recording head 80 is located to the flushing area R2 so as to prepare for the printing process to be executed. At this stage, the switching lever 90 is maintained at the position B due to the above-described structure of the lever holder 240, the destination of the driving force is maintained to be the second sheet feeder 320, and the conveyance original tray is maintained to be the second tray 323.

Thereafter, the main controller 10 waits for receipt of the top one-path amount of print job data following the preceding data (S350: NO). In response to receipt of the top one-path amount of print job data (S350: YES), the main controller 10 determines the usage target tray based on the print condition represented by the top one-path amount of print job data (S355). A method of determining the usage target tray is similar to the method in S255.

After the usage target tray is determined in S355, the main controller 10 determines presence/absence of the sheets Q in the usage target tray based on the detection signal from one of the sheet sensors SN1, SN2 and SN3 corresponding to the usage target tray (S360).

When it is determined that there is no sheet Q in the usage target tray (S360: NO), the main controller 10 executes the error process (S365). The error process in S365 is the same as that in S265. Thereafter, the main controller 10 terminates the print control process.

When it is determined that there are sheets Q in the usage target tray (S360: YES), the main controller 10 determines whether the usage target tray is the second tray 323 (S370). When it is determined that the usage target tray is the second tray 323 (S370: YES), the main controller 10 proceeds to S390, and starts the printing process as in S290. At this stage, the conveyance origin tray has been set to be the second tray 323 by the preparation operation (S320, S325, S330 and S355), and the sheet feeder, which is the destination of the driving force, has been determined to be the second sheet feeder 320.

When it is determined that the usage target tray is not the second tray 323 (S370: NO), the main controller 10 proceeds to S380, and executes the switching process. When the main controller 10 moves to S380, the usage target tray is set to be the third tray 333. Therefore, as a result of the switching process, the main controller 10 sets the sheet feeder, which is the destination of the driving force, to the third sheet feeder 330, and sets the third tray 333 as the conveyance origin tray. A method of switching the destination of the driving force is the same as in S380.

After execution of S380, the main controller 10 proceeds to S390. In S390, the main controller 10 executes the printing process, in which the main controller 10 transmits instructions to the print controller 50 and the conveyance controller 60 so that print target images are printed on the sheets Q based on the print job data. Thus, on the sheets Q supplied from the usage target tray, images are formed based on the print job data transmitted from the image processing apparatus 5. After the printing process is completed, the main controller 10 terminates the print control process.

When it is determined that there is no sheet Q in the second tray 323, the main controller 10 proceeds to S410. In S410, the main controller 10 determines presence/absence of the sheets Q in the third tray 333. When it is determined that there is no sheet Q in the third tray 333 (S410: NO), the main controller 10 executes the error process as in S265 or S365 (S415).

The error process executed in S415 includes a process of notifying the image processing apparatus 5 of the fact that none of the standard tray 313, the second tray 323 and the third tray 333 accommodates the sheet Q. When none of the standard tray 313, the second tray 323 and the third tray 333 accommodates the sheet Q, the printing process cannot be executed unless the user supplies the sheets Q. Therefore, according to the illustrative embodiment, the notification is made with the carriage 71 being stayed (without moving the carriage 71), or without executing the preparation operation regarding the conveyance of the sheets Q. Thereafter, the main controller 10 terminates the print control process.

When it is determined that there are the sheets Q in the third tray 333 (S410: YES), the main controller 10 proceeds to S420. In S420, the main controller 10 controls the carriage conveying mechanism 70 through the print controller 50, and moves the carriage 71 from the home position to the particular reverse position. It is noted that the reverse position is determined to be the same position as determined in S320. As the main controller 10 executes S420, similar to the process in S220, the restraining of the carriage 71 by the switching lever 90 is released and the switching lever 90 becomes movable to the position A, and the cap 351 is removed from the recording head.

After execution of S420, the main controller 10 controls the conveyance controller 60 to cause the movable gear 220 to make forward/reverse rotations so that the movable gear 220 engages with the connection gear 230A and the switching lever 90 moves to the position A (S425).

Thereafter, the main controller 10 proceeds to S430. In S430, the main controller controls the print controller 50 to move the carriage 71 so that the switching lever 90 is moved to the position C. Specifically, the main controller 10 moves the carriage 71 located at the reverse position as shown in FIG. 10A to the maintenance area R1 side so that the switching lever 90 is pushed to be moved from the position A to the position C by the carriage 71.

There is a possibility that movable gear 220 may not be engaged with the connection gear 230C corresponding to the position C simply by pushing the switching lever 90 to the position C, which is executed in S430. Therefore, in the following step (i.e., S435), the main controller 10 controls the movable gear 220 to make the forward/reverse rotations as in a process in S425.

By execution of S430 and S435, the switching lever 90 is located to the position C and the movable gear 220 once engages with the connection gear 230B, and then engages with the connection gear 230C, thereby the destination of the driving force of the conveying motor 110 is set to the third sheet feeder 330. Thus, the third tray 333 is set to be the conveyance origin tray (S435).

After execution of S435, the main controller 10 proceeds to S440, controls the carriage conveying mechanism 70 through the print controller 50, to move the carriage 71 to the flushing area R2. At this stage, the switching lever 90 is stayed at the position C due to the structure of the lever holder 240 described above, the destination of the driving force is maintained to be the third sheet feeder 330 and the conveyance origin tray is maintained to be the third tray 333.

Thereafter, the main controller 10 waits for receipt of top one-path amount of print job data following the preceding data (S450: NO). In response to receipt of the top one-amount of print job data (S450: YES), the main controller 10 determines the usage target tray based on the print condition indicated by the received top one-path amount of print job data (S455). The method of determining the usage target tray is the same as that in S255.

After the usage target tray is determined in S455, the main controller 10 determines whether the usage target tray is the third tray 333 (S460). At this stage of determination, basically, there are no sheets Q in the standard tray 313 or the second tray 323, and there are sheets Q only in the third tray 333.

When it is determined that the usage target tray is not the third tray 333 (S460: NO), the main controller 10 executes the error process as is done in S265 or S365 (S465), and terminates the print control process. When it is determined that the usage target tray is the third tray 333 (S460: YES), the main controller 10 proceeds to S490 and executes the printing process as in S290. At this stage, the conveyance origin tray has been set to the third tray 333, which is the usage target tray, by the previously executed preparation operation (S420, S426, S430 and S435), and the sheet feeder which is the destination of the driving force has been set to the third sheet feeder 330. Thus, images based on the print job data transmitted from the image processing apparatus 5 are formed on the sheets Q supplied from the usage target tray. After execution of the printing process, the main controller 10 terminates the print control process.

According to the image forming system described above, after the image processing apparatus 5 transmits the preceding data in response to input of the print instruction by the user (S110), the image processing apparatus 5 transmits the print job data indicating the print condition to the image forming system 1 (S130).

The main controller 10 of the image forming system 1 sequentially receives the preceding data and the print job data from the image processing apparatus 5 in the transmitted order through the communication interface 20 (S200, S250, S350 and S450). Then, in response to receipt of the preceding data, the main controller 10 controls the carriage 71. With this control, the cap 351 is removed from the recording head 80. The switching lever 90 is located to the position A. Further, the main controller 10 controls the conveying motor 110. With this control, the movable gear 220 is caused to make the forward/reverse rotations, thereby the movable gear 220 engaging with the connection gear 230A. That is, a connection state of the sheet feeder 310, 320 and 330 with respect to the conveying motor 110 is switched such that the destination of the driving force of the conveying motor 110 is set to the standard sheet feeder 310.

In other words, the main controller 10 switch the connection state from a state where the none of the sheet feeders 310, 320 and 330 is connected with the conveying motor 110 to a state where the standard sheet feeder 310 having the standard tray 313 can be driven by the conveying motor 110. When there is no sheet Q in the standard tray 313, in accordance with the switching order of the switching lever 90 and the gears, a tray accommodating the sheets Q and having a higher order according to the switching order is selected from among the second and third trays 323 and 333, each of which has a lower order, according to the switching order, than the standard tray 313. Thus, the preparation operation of the sheet feeder is executed to prepare for conveyance of the sheets Q in the printing process.

When the usage target tray identified from the print condition represented by the print job data received from the information processing apparatus 5 is different from the conveyance origin tray set in the preparation operation, the main controller switches the connection states of the sheet feeders 310 and 320 with respect to the conveying motor 110 so that the sheet feeder following the print condition is driven.

Thereafter, the main controller 10 transmits instructions to the print controller 50 and the conveyance controller 60 so that the images based on the print job data are formed on the sheets Q, and controls the respective components of the image forming system 1 through the print controller 50 and the conveyance controller 60. Specifically, the main controller 10 controls the movement of the carriage 71 by the carriage conveying mechanism, the operation to eject the ink droplets from the recording head 80, the sheet feeding operation by the sheet feeders 310, 320 and 330, and sheet conveying operation by the sheet conveying mechanism 100 through the print controller 50 and the conveyance controller 60.

According to the image forming system 1, until the print job data is received, which of the sheet feeders 310, 320 and 330 is to be driven cannot be identified. However, if the drive preparation of the sheet feeder 310, 320 and 330 are postponed until the driven target is identified, it becomes difficult to improve the throughput regarding the printing process. Therefore, according to the illustrative embodiment, the preparation operation of the sheet feeder 310, which is a standard (i.e., generally used) sheet feeder, among the multiple sheet feeders 310, 320 and 330 is executed.

If it is notified to the users that the standard tray 313 is the standard tray and the frequently used sheets Q are accommodated in the standard tray 313 through an operation manual or the like, a possibility that the above-described preparation operation before the destination of the driving force becomes a waste of effort can be suppressed. Rather, the image forming system 1 can be prepared for feeding of the sheets Q effectively with the above-described configuration. That is, according to the illustrative embodiment, as an operation related to the printing operation, the preparation operation for the sheet feeder can be executed effectively, and the throughput in the printing process can be improved. It is noted, however, the standard tray needs not be limited to the tray accommodating frequently used sheets Q. That is, the standard tray may be the tray having a highest priority, among the multiple trays the image forming system 1 has, in determining the conveyance origin tray during execution of the preparation operation which is executed in response to receipt of the preceding data.

When there is no sheet Q in the standard tray 313, even if the standard sheet feeder 310, which corresponds to the standard tray 313, is set to be the destination of the driving force, the printing process cannot be executed. According to the illustrative embodiment, when there is no sheet Q in the standard tray 313, which is the standard tray, another sheet feeder 320 or 330 which has another tray 323 or 333 is set as the destination of the driving force so that the preparation of the sheet feeder is executed efficiently.

According to the illustrative embodiment, when there is no sheet Q in the standard tray 313, one of the trays 323 and 333, which have lower priority in the switching order of the switching lever 90, and accommodating the sheets Q is determined to be the conveyance origin tray. Therefore, according to the illustrative embodiment, setting of the conveyance origin tray, which may be re-set when the print job data is received, can be done with suppressing the number of switching of the gears, thereby realizing the preparation operation regarding the conveyance of the sheets Q efficiently.

Further, according to the illustrative embodiment, when the carriage 71 is moved for the purpose of executing the preparation operation of the sheet feeders, the capping mechanism 350 is simultaneously operated to realize the uncapping process with respect to the recording head 80. Thus, a removal operation of the cap 351 from the recording head 80 and the preparation for driving the sheet feeders can be executed efficiently.

Further, according to the illustrative embodiment, after the switching lever 90 is switched, the carriage 71 and the recording head 80 are located to the flushing area R2 so as to prepare for the flushing operation to be executed at the beginning of the printing process. Additionally, according to the illustrative embodiment, when no sheets Q are present in any one of the trays, the error process is executed without executing the preparation operation in response to receipt of the preceding data. Therefore, according to the illustrative embodiment, an efficient preparation operation regarding the printing process can be executed.

Other Embodiments

In the above description, the image forming system 1 according to the illustrative embodiment is described. It is noted that the present disclosure need not to be limited to the configuration described above referring to the illustrative embodiment, but could be modified in various ways without departing from the gist of the disclosures.

In the above-described image forming system 1, the elevator 353 is configured to lift the cap 351 as the carriage 71 is contacted/separated with respect to the contacting member (i.e., the wall 353A). It is noted that another lifting mechanism may be employed in the image forming system 1. For example, the image forming system 1 may be configured such that an additional motor may be employed to move the cap 351 and the elevator 353. In such a case, by driving the additional motor, the elevator 353 may be operated to lift the cap 351. Further, the main controller 10 may drive the additional motor to move down the elevator 353 to move down the cap 351 when the carriage 71 is controlled to leave the home position.

It is noted that a function realized by one component in the above-described illustrative embodiment may be realized by a plurality of components. Further, a function realized by a plurality of components in the above-described embodiment may be integrally realized by a single component. A part of the components in the above-described embodiment may be omitted. Further, at least a part of the configurations of the above-described embodiment may replace or be additionally employed at least a part of configurations of another embodiment. Any aspects of technical features derived from recitation set forth in the claims should be included as embodiments according the present disclosures.

What is claimed is:

1. An image forming system, comprising:
a communication interface;
a standard sheet feeder configured to pick up sheet on a standard tray;
an auxiliary sheet feeder configured to pick up sheet on a second tray;
a motor configured to selectively apply a drive force to one of the standard and auxiliary sheet feeders;
a transmission assembly configured to switch transmission of the drive force selectively to the one of the standard and auxiliary sheet feeders, by switching a connection between the motor and the one of the standard and auxiliary sheet feeders;
an image forming device including a recording head; and
a controller configured to:
receive preceding data in a first transmission from the communication interface, wherein the preceding data includes data instructing preparation for printing and includes data advising that print job data will be subsequently transmitted, the subsequent transmission comprising control data;
after completing receipt of the first transmission, determine whether the sheet is present or absent in the standard and the auxiliary trays, and, based on determining that the sheet is absent in the standard tray and the sheet is present in the auxiliary tray, control the transmission assembly to initiate switching of the transmission of the drive force to the auxiliary sheet feeder; and
after completing receipt of the first transmission, receive the control data in a second transmission from the communication interface and control the image forming device to form an image on picked-up sheet based on the control data.

2. The image forming system according to claim 1, wherein the controller is configured to, based on determining that the sheet is present in the standard and auxiliary trays and receipt of the preceding data, control the transmission assembly to initiate to switch the transmission of the drive force to the standard sheet feeder.

3. The image forming system according to claim 1, further comprising a next-auxiliary sheet feeder configured to pick up sheet on a next-auxiliary tray,
wherein the motor is configured to selectively apply a drive force to one of the standard, auxiliary and next-auxiliary sheet feeders;
wherein the transmission assembly configured to switch transmission of the drive force selectively to the one of the standard, auxiliary and next-auxiliary sheet feeders, by switching a connection between the motor and the one of the standard, auxiliary and next-auxiliary sheet feeders.

4. The image forming system according to claim 1, wherein the controller is configured to control the transmission assembly to initiate to switch the transmission of the drive force prior to receipt of the control data.

5. The image forming system according to claim 1, wherein the transmission assembly is configured to:
switch the transmission of the drive force to the standard sheet feeder from a disconnected state in which the standard and auxiliary sheet feeders are disconnected from the motor; and
switch the transmission of the drive force from the standard sheet feeder to the auxiliary sheet feeder.

6. The image forming system according to claim 1, wherein the image forming device is movable reciprocally in a scanning direction and configured to form the image during moving in the scanning direction.

7. The image forming system according to claim 1, wherein the control data includes setting information representing a usage target tray accommodating a sheet on which an image is to be formed based on the print job data.

8. The image forming system according to claim 2, wherein the controller is configured to:
based on receipt of the control data, determine whether the control data indicates the one of the standard and auxiliary sheet feeders;
based on determining that the sheet is present in the standard tray and determining the control data indicates the auxiliary sheet feeder, control the transmission assembly to switch the transmission of the drive force to the auxiliary sheet feeder from the standard sheet feeder.

9. The image forming system according to claim 8, wherein the controller is configured to, based on determining that the sheet is present in the standard tray and determining the control data indicates the auxiliary sheet feeder, control the transmission assembly to switch the transmission of the drive force to the auxiliary sheet feeder from the standard sheet feeder after switch of the transmission of the drive force to the standard sheet feeder.

10. The image forming system according to claim 9, wherein the controller is configured to, based on determining that the sheet is present in the standard tray and determining the control data indicates the auxiliary sheet feeder, control the motor to make the auxiliary sheet feeder to pick up sheet after switch of the transmission of the drive force to the auxiliary sheet feeder.

11. The image forming system according to claim 8, wherein the controller is configured to, based on determining that the sheet is present in the standard tray and determining the control data indicates the standard sheet feeder, control the motor to make the standard sheet feeder to pick up sheet after switch of the transmission of the drive force to the standard sheet feeder.

12. The image forming system according to claim 8, wherein the controller is configured to, based on determining that the sheet is absent in the standard tray and the sheet is present in the auxiliary tray and determining the control data indicates the auxiliary sheet feeder, control the motor to make the auxiliary sheet feeder to pick up sheet after switch of the transmission of the drive force to the auxiliary sheet feeder.

13. The image forming system according to claim 3, wherein the controller is configured to:
determine whether the sheet is present or absent in next-auxiliary tray;
based on determining that the sheet is absent in the standard tray and the sheet is present in the auxiliary and next-auxiliary trays and receipt of the preceding data, control the transmission assembly to initiate to switch the transmission of the drive force to the auxiliary sheet feeder.

14. The image forming system according to claim 13, wherein the controller is configured to, based on determining that the sheet is only present in the next-auxiliary tray and receipt of the preceding data, control the transmission assembly to initiate to switch the transmission of the drive force to the next-auxiliary sheet feeder.

15. The image forming system according to claim 13, wherein the controller is configured to, based on determining the sheet is absent in the standard, auxiliary and next-auxiliary trays and receipt of the preceding data, notify an error.

16. The image forming system according to claim 13, wherein the controller is configured to:
  based on receipt of the control data, determine whether the control data indicates the one of the standard, auxiliary and next-auxiliary sheet feeders;
  based on determining that the sheet is absent in the standard tray and the sheet is present in the auxiliary and next-auxiliary trays and the control data indicates the auxiliary sheet feeder, control the motor to make the auxiliary sheet feeder to pick up sheet after switch of the transmission of the drive force to the auxiliary sheet feeder.

17. The image forming system according to claim 16, wherein the controller is configured to, based on determining that the sheet is absent in the standard tray and the control data indicates the next-auxiliary sheet feeder, control the transmission assembly to switch the transmission of the drive force to the next-auxiliary sheet feeder from the auxiliary sheet feeder.

18. The image forming system according to claim 17, wherein the controller is configured to, based on determining that the sheet is absent in the standard tray and the control data indicates the next-auxiliary sheet feeder, control the transmission assembly to switch the transmission of the drive force to the next-auxiliary sheet feeder from the auxiliary sheet feeder after switch of the transmission of the drive force to the auxiliary sheet feeder.

19. The image forming system according to claim 18, wherein the controller is configured to, based on determining that the sheet is absent in the standard tray and the control data indicates the next-auxiliary sheet feeder, control the motor to make the next-auxiliary sheet feeder to pick up sheet after switch of the transmission of the drive force to the next-auxiliary sheet feeder.

20. The image forming system according to claim 3, wherein the transmission assembly is configured to:
  switch the transmission of the drive force to the standard sheet feeder from a disconnected state in which the standard and auxiliary sheet feeders are disconnected from the motor;
  switch the transmission of the drive force from the standard sheet feeder to the auxiliary sheet feeder; and
  switch the transmission of the drive force from the auxiliary sheet feeder to the next-auxiliary sheet feeder.

21. The image forming system according to claim 6, wherein the transmission assembly is configured to switch the transmission of the drive force by a force generated by movement of the image forming device in the scanning direction,
  wherein the controller is configured to control the transmission assembly by controlling the movement of the image forming device in the scanning direction.

22. The image forming system according to claim 21, wherein the image forming device movable in a main area and neighboring area, the main area is an area in which the image forming device forms to the image, the neighboring area is an area neighboring the main area, wherein the transmission assembly is positioned in the neighboring area.

23. The image forming system according to claim 22, further comprising a capping mechanism having a cap and positioned in the neighboring area, the capping mechanism is configured to cap the recording head which is configured to eject ink droplets;
  wherein the controller is configured to, based on the receipt of the preceding data, separate the cap and the recording head.

24. The image forming system according to claim 23, wherein the controller is configured to separate the cap and the recording head by moving the image forming device toward the main area from the neighboring area.

25. An image forming system, comprising:
  a communication interface;
  a standard sheet feeder configured to pick up sheet on a standard tray;
  an auxiliary sheet feeder configured to pick up sheet on a second tray;
  a motor configured to selectively apply a drive force to one of the standard and auxiliary sheet feeders;
  a transmission assembly configured to switch transmission of the drive force selectively to the one of the standard and auxiliary sheet feeders, by switching a connection between the motor and the one of the standard and auxiliary sheet feeders;
  an image forming device including a recording head; and
  a controller configured to:
    receive preceding data in a first transmission from the communication interface;
    after completing receipt of the first transmission, determine whether the sheet is present or absent in the standard and the auxiliary trays, and, based on determining that the sheet is absent in the standard tray and the sheet is present in the auxiliary tray, control the transmission assembly to initiate switching of the transmission of the drive force to the auxiliary sheet feeder; and
    after completing receipt of the first transmission, receive control data in a second transmission from the communication interface and control the image forming device to form an image on picked-up sheet based on the control data,
  wherein the image forming device is movable reciprocally in a scanning direction and configured to form the image during moving in the scanning direction,
  wherein the transmission assembly is configured to switch the transmission of the drive force by a force generated by movement of the image forming device in the scanning direction,
  wherein the controller is configured to control the transmission assembly by controlling the movement of the image forming device in the scanning direction,
  wherein the image forming device movable in a main area and neighboring area, the main area is an area in which the image forming device forms to the image, the neighboring area is an area neighboring the main area,
  wherein the transmission assembly is positioned in the neighboring area,
  wherein the transmission assembly is configured to:
    switch the transmission of the drive force to the standard sheet feeder in response to the image forming device passing a first position in the neighboring area in a first direction, the first direction corresponding to a direction in which the image forming device moves from the neighboring area to the main area; and
    switch the transmission of the drive force to the auxiliary sheet feeder in response to the image forming device passing a second position in the neighboring area in a second direction opposite to the first direction.

26. The image forming system according to claim 25, wherein the first position is closer than the second position from the main area.

27. The image forming system according to claim 26, wherein the controller is configured to, based on determining that the sheet is absent in the standard tray and the sheet is present in the auxiliary tray and receipt of the preceding data, control the image forming device to:
pass the first position by moving in the first direction,
in response to the image forming device passing the first position, pass the second position by moving in the second direction.

28. The image forming system according to claim 27, wherein the controller is configured to eject ink droplets from the recording head in a flushing area, the main area being positioned between the flushing area and the neighboring area.

29. The image forming system according to claim 28, wherein the controller is configured to, based on determining that the sheet is absent in the standard tray and the sheet is present in the auxiliary tray and receipt of the preceding data;
pass the first position by moving in the first direction;
in response to the image forming device passing the first position, pass the second position by moving in the second direction without being passed the flushing area.

30. A method of controlling an image forming system including a transmission assembly for switching transmission of a drive force of a motor selectively to the one of standard and auxiliary sheet feeders, comprising:

receiving preceding data in a first transmission from a communication interface of the image forming system, wherein the preceding data includes data instructing preparation for printing and includes data advising that print job data will be subsequently transmitted, the subsequent transmission comprising control data;

after completing receipt of the first transmission, determining whether the sheet is present or absent in standard and auxiliary trays, the standard sheet feeder being configured to pick up sheet on the standard tray and the auxiliary sheet feeder being configured to pick up sheet on the auxiliary tray, and, based on determining that the sheet is absent in the standard tray and the sheet is present in the auxiliary tray, controlling the transmission assembly to initiate switching of the transmission of the drive force to the auxiliary sheet feeder;

after completing receipt of the first transmission, receiving the control data in a second transmission from the communication interface and controlling an image forming device including recording head to form an image on picked-up sheet based on the control data included in the control data.

* * * * *

UNITED STATES PATENT AND TRADEMARK OFFICE
CERTIFICATE OF CORRECTION

PATENT NO. : 10,137,711 B2  
APPLICATION NO. : 15/277608  
DATED : November 27, 2018  
INVENTOR(S) : Yusuke Arai Page 1 of 1

It is certified that error appears in the above-identified patent and that said Letters Patent is hereby corrected as shown below:

On the Title Page

(56) References Cited:  
FOREIGN PATENT DOCUMENTS  
Delete "EP 1591262 A2 2/2005" and replace with -- EP 1591262 A2 11/2005 -- therefor.

Signed and Sealed this  
Twelfth Day of February, 2019

Andrei Iancu  
*Director of the United States Patent and Trademark Office*